United States Patent
Arai et al.

(10) Patent No.: US 12,514,991 B2
(45) Date of Patent: Jan. 6, 2026

(54) EMISSION DEVICE

(71) Applicant: DAIKIN INDUSTRIES, LTD., Osaka (JP)

(72) Inventors: Junichiro Arai, Osaka (JP); Nobuaki Takeda, Osaka (JP); Satoshi Ozawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/228,567

(22) Filed: Jul. 31, 2023

(65) Prior Publication Data

US 2023/0372636 A1 Nov. 23, 2023

Related U.S. Application Data

(63) Continuation of application No. PCT/JP2022/004950, filed on Feb. 8, 2022.

(30) Foreign Application Priority Data

Feb. 12, 2021 (JP) .................. 2021-020488

(51) Int. Cl.
*A61M 11/00* (2006.01)
*A61B 5/00* (2006.01)
(Continued)

(52) U.S. Cl.
CPC ........... *A61M 11/00* (2013.01); *A61B 5/4836* (2013.01); *A61L 9/14* (2013.01); *A61M 21/02* (2013.01);
(Continued)

(58) Field of Classification Search
CPC .......... A61M 11/00; A61M 2205/3303; A61M 2205/3334; A61M 2206/16;
(Continued)

(56) References Cited

U.S. PATENT DOCUMENTS

| | | | |
|---|---|---|---|
| 4,710,887 A | 12/1987 | Ho | |
| 2010/0025490 A1* | 2/2010 | Bushman | A61L 9/03 239/289 |

(Continued)

FOREIGN PATENT DOCUMENTS

| | | |
|---|---|---|
| CN | 110974703 A | 4/2020 |
| EP | 3 039 351 B1 | 8/2018 |

(Continued)

OTHER PUBLICATIONS

International Preliminary Report of corresponding PCT Application No. PCT/JP2022/004950 dated Aug. 24, 2023.
(Continued)

*Primary Examiner* — Kendra D Carter
*Assistant Examiner* — Brian T Khong
(74) *Attorney, Agent, or Firm* — Global IP Counselors, LLP

(57) ABSTRACT

An emission device includes an emission unit, and a controller. The emission unit emits a useful substance to a space where a target person is present. The controller controls the emission unit based on a circadian rhythm of the target person. The controller determines which one of a sympathetic nerve or a parasympathetic nerve is dominant in an autonomic nerve system of the target person, estimates the circadian rhythm of the target person in the autonomic nerve system from a result of the determination, determines a time to start emitting the useful substance based on the circadian rhythm estimated, and emits the useful substance from the emission unit when the time to start the emitting has come.

20 Claims, 8 Drawing Sheets

(51) Int. Cl.
*A61L 9/14* (2006.01)
*A61M 21/02* (2006.01)

(52) U.S. Cl.
CPC ............ *A61L 2209/134* (2013.01); *A61M 2205/3303* (2013.01); *A61M 2205/3334* (2013.01); *A61M 2206/16* (2013.01); *A61M 2230/06* (2013.01); *A61M 2230/40* (2013.01); *A61M 2230/50* (2013.01)

(58) Field of Classification Search
CPC .......... A61M 2230/06; A61M 2230/40; A61M 2230/50; A61M 2021/0077; A61M 2021/0016; A61M 2021/0005; A61M 21/02; A61B 5/4806; A61B 5/4857; A61B 5/6889; A61L 9/03; F15D 1/009
See application file for complete search history.

(56) References Cited

U.S. PATENT DOCUMENTS

| | | | | |
|---|---|---|---|---|
| 2015/0019041 | A1* | 1/2015 | Chandler | A61L 9/035 700/306 |
| 2015/0320965 | A1* | 11/2015 | Van Groningen | A61M 21/00 600/27 |
| 2016/0158774 | A1* | 6/2016 | Brav | B05B 7/10 239/8 |
| 2018/0050171 | A1* | 2/2018 | Tabert | C11D 3/50 |
| 2019/0027240 | A1* | 1/2019 | Davidson | G16H 20/13 |
| 2020/0138369 | A1* | 5/2020 | Shimuta | G16H 20/30 |
| 2020/0306496 | A1* | 10/2020 | Radha | G16H 40/63 |
| 2022/0065485 | A1* | 3/2022 | Aoki | F24F 8/50 |

FOREIGN PATENT DOCUMENTS

| | | | |
|---|---|---|---|
| JP | 2004-53102 A | 2/2004 | |
| JP | 2020-14535 A | 1/2020 | |
| WO | WO-2015030538 A1 * | 3/2015 | ............ B05B 5/053 |
| WO | 2017/149684 A1 | 9/2017 | |
| WO | 2018/166795 A1 | 9/2018 | |
| WO | 2019/121830 A1 | 6/2019 | |
| WO | 2020158560 A1 | 8/2020 | |

OTHER PUBLICATIONS

International Search Report of corresponding PCT Application No. PCT/JP2022/004950 dated Apr. 12, 2022.
European Search Report of corresponding EP Application No. 22 75 2747.0 dated Apr. 6, 2024.

* cited by examiner

EMISSION DEVICE

CROSS-REFERENCE TO RELATED APPLICATIONS

This is a continuation of International Application No. PCT/JP2022/004950 filed on Feb. 8, 2022, which claims priority to Japanese Patent Application No. 2021-020488, filed on Feb. 12, 2021. The entire disclosures of these applications are incorporated by reference herein.

BACKGROUND

Technical Field

The present disclosure relates to an emission device.

Background Art

Japanese Unexamined Patent Publication No. 2020-14535 discloses an inhaler for administering medications to a respiratory system. The inhaler of Japanese Unexamined Patent Publication No. 2020-14535 includes a nozzle plate that is vibrated by a piezoelectric element to spray an inhalant. The sprayed inhalant is delivered to the user's respiratory organ via a mask-type inhaler portion that covers the user's nose and mouth.

SUMMARY

A first aspect of the present disclosure is directed to an emission device including an emission unit, and a controller. The emission unit is configured to emit a useful substance to a space where a target person is present. The controller is configured to control the emission unit based on a circadian rhythm of the target person. The controller is configured to determine which one of a sympathetic nerve or a parasympathetic nerve is dominant in an autonomic nerve system of the target person, estimate the circadian rhythm of the target person in the autonomic nerve system from a result of the determination, determine a time to start emitting the useful substance based on the circadian rhythm estimated, and emit the useful substance from the emission unit when the time to start the emitting has come.

DETAILED DESCRIPTION OF EMBODIMENT(S)

Hereinafter, embodiments of the present disclosure will be described with reference to the drawings. The following embodiments are merely exemplary ones in nature, and are not intended to limit the scope, application, or use of the present invention.

First Embodiment

A first embodiment will be described.

Figure 1:
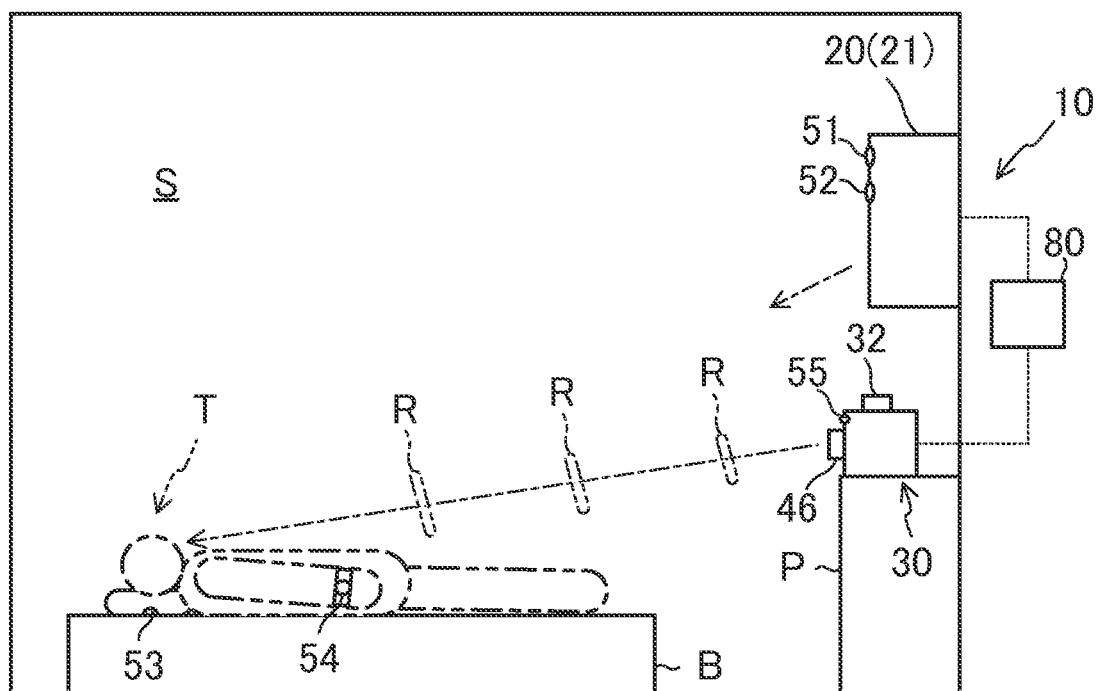
FIG. 1 is a diagram illustrating a schematic overall configuration of an emission device of a first embodiment.

As illustrated in FIG. 1, an emission device (10) of the first embodiment is disposed in an indoor space (S) in which a target person (T) is present. The target person (T) sleeps, for example, on bedding (B) such as a bed in the indoor space (S). In this embodiment, the target person (T) has a respiratory disease of asthma and has symptoms of a cough attack. The respiratory disease of the target person (T) may be a chronic obstructive pulmonary disease (COPD) or bronchitis, which causes symptoms of cough attacks.

The emission device (10) of the first embodiment is a device that emits a useful substance (U) to the target person (T). Specifically, the emission device (10) emits the useful substance (U) to a target portion of the target person (T). In this embodiment, the target portion of the target person (T) includes his/her mouth and nose.

The useful substance (U) in this embodiment includes cineole, menthol, and terpinen-4-ol. The amount of components contained in the useful substance (U) is appropriately selected depending on symptoms of the target person (T), other components blended with the above components, and the like, and is not particularly limited.

Emission Device

As illustrated in FIG. 1, the emission device (10) includes an air conditioning unit (20), an emission unit (30), a temperature sensor (51), a humidity sensor (52), a concentration sensor (53), a contact sensor (54), a camera (55), and a controller (80).

Air Conditioning Unit

The air conditioning unit (20) performs air conditioning of the indoor space (S). As illustrated in FIG. 1, the air conditioning unit (20) includes an indoor unit (21) of a wall-mounted type for example. The indoor unit (21) is coupled to an outdoor unit (not shown) via a refrigerant pipe. The air conditioning unit (20) cools or heats indoor air (room air) with a refrigerant with which a refrigeration cycle is performed. In this manner, the temperature of air in the indoor space (S) is adjusted. The air conditioning unit (20) adjusts the humidity of the indoor air (room air) in addition to the temperature thereof. The air conditioning unit (20) constitutes an environment adjustment unit (90) that adjusts the temperature and humidity which are environmental conditions of the indoor space (S).

Emission Unit

Figure 2:
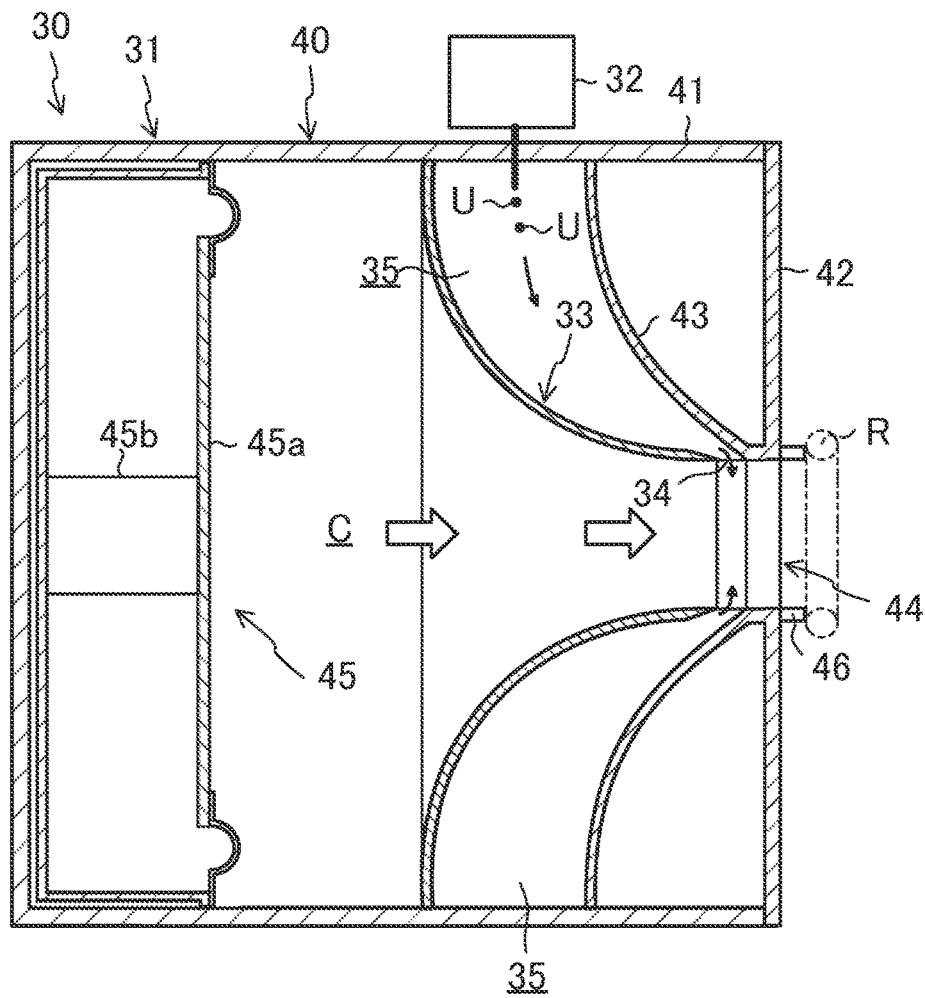
FIG. 2 is a diagram illustrating a vertical cross-sectional view of the emission device.

As illustrated in FIG. 1, the emission unit (30) is placed on a shelf (P) in the indoor space (S) for example. The emission unit (30) emits the useful substance (U) to the indoor space (S). As illustrated in FIG. 2, the emission unit (30) includes a vortex ring generation unit (31) and a substance supply unit (32). The vortex ring generation unit (31) emits an airflow (vortex ring (R)) in a vortex ring shape. The substance supply unit (32) supplies the useful substance (U) to the airflow (vortex ring (R)).

The emission unit (30) makes the useful substance (U) contained in the vortex ring (R) and supplies the vortex ring (R) containing the useful substance (U) toward the target portion of the target person (T). The useful substance (U) may be gas, liquid, or solid, and is preferably in particulate form if liquid or solid. The vortex ring generation unit (31) of this embodiment constitutes the environment adjustment unit (90) that adjusts the airflow which is an environmental condition of the indoor space (S).

Vortex Ring Generation Unit

As illustrated in FIG. 2, the vortex ring generation unit (31) includes a casing (40), an extrusion mechanism (45), and a movable nozzle (46). The casing (40) includes a casing body (41), a front panel (42), and a peripheral wall (43). The casing body (41) has a box shape where the front side is open. The front panel (42) has a substantially plate shape to block an opening surface of the front side of the casing body (41). A center portion of the front panel (42) has an emission port (44) in a circular shape passing therethrough in a front-rear direction. The peripheral wall (43) has a substantially cylindrical shape continuous with a rear surface of the front panel. The peripheral wall (43) has a tapered shape having a diameter which is gradually decreasing frontward.

The extrusion mechanism (45) is disposed rearward in the casing (40). The extrusion mechanism (45) includes a diaphragm (45a) and a linear actuator (45b) for actuating the diaphragm (45a). The linear actuator (45b) displaces the diaphragm (45a) back and forth. A proximal end (rear end) of the linear actuator (45b) is supported by a rear wall of the casing body (41). A distal end (front end) of the linear actuator (45b) is coupled with a center of the diaphragm (45a).

In the casing (40), an air passage (C) through which air flows extends from the diaphragm (45a) to the emission port (44). In the vortex ring generation unit (31), the air in the air passage (C) extruded by the extrusion mechanism (45) is formed into the vortex ring (R) and emitted from the emission port (44).

The movable nozzle (46) is provided on a center portion of the front panel (42). A distal end of the movable nozzle (46) has a circular shape. The movable nozzle (46) is coupled with a motor (not shown) via a shaft. The motor drives and rotates the shaft to adjust the direction of the movable nozzle (46). The movable nozzle (46) is directed toward the indoor space (S). The direction of the movable nozzle (46) is adjusted to change the direction of the airflow (vortex ring (R)). This allows the vortex ring (R) to be emitted toward the target portion of the target person (T).

Substance Supply Unit, Passage Formation Portion, and Substance Supply Port

The substance supply unit (32) is a device for providing the airflow (vortex ring (R)) with a predetermined useful substance (U). The substance supply unit (32) includes a tank storing the useful substance (U) and a transfer unit (not shown) configured to transfer the useful substance (U) in the tank. The transfer unit is, for example, an air pump. The substance supply unit (32) may include a vaporization type substance generator that vaporizes the useful substance.

The emission unit (30) further includes a passage formation portion (33) and a substance supply port (34). The passage formation portion (33) is disposed behind the peripheral wall (43) of the casing (40). The passage formation portion (33) has a substantially cylindrical shape along an inner peripheral surface of the peripheral wall (43). The passage formation portion (33) has a tapered shape having a diameter gradually decreasing frontward.

A reservoir (35) temporarily storing the useful substance (U) is defined by an inner wall of the casing body (41), the peripheral wall (43), and the passage formation portion (33). The reservoir (35) is a substantially cylindrical space formed around the passage formation portion (33). The useful substance (U) adjusted to a predetermined concentration is supplied appropriately from the substance supply unit (32) to the reservoir (35).

The emission unit (30) includes the substance supply port (34). The substance supply port (34) is an opening for supplying the useful substance (U) to the air passage (C). The substance supply port (34) is disposed near the emission port (44). Specifically, the substance supply port (34) is provided between a downstream end of the passage formation portion (33) in the cylindrical axis direction and an inner peripheral portion of the emission port (44). Thus, the substance supply port (34) has an annular shape around a downstream end of the air passage (C). The useful substance (U) is supplied from the substance supply unit (32) to the reservoir (35) defined in the casing (40), and is supplied to the air passage (C) through the substance supply port (34).

Temperature Sensor and Humidity Sensor

The temperature sensor (51) measures the temperature of the indoor space (S). The humidity sensor (52) measures the humidity of the indoor space (S). The temperature sensor (51) and the humidity sensor (52) of this embodiment are attached to the indoor unit (21) of the air conditioning unit (20). The temperature sensor (51) and the humidity sensor (52) may be attached to the emission unit (30), or may be provided in the indoor space (S) independently of the air conditioning unit (20) and the emission unit (30).

Concentration Sensor

The concentration sensor (53) measures the concentration of the useful substance (U) supplied to the target person (T). The concentration sensor (53) of this embodiment is placed next to the head of the target person (T). The concentration sensor (53) of this embodiment detects the concentration of the useful substance (U) in the indoor space (S). The concentration sensor (53) may be provided on the emission unit (30) or the air conditioning unit (20), or may be adhered to the target portion of the target person (T).

Contact Sensor and Camera

The contact sensor (54) is a wearable sensor integral with a wristwatch. The contact sensor (54) of this embodiment is put on an arm of a target person (T). The contact sensor (54) detects signals that underlie the heart rate and body temperature of the target person (T). In other words, the contact sensor (54) serves as a biosensor (60) that acquires biological information of the target person (T).

The camera (55) is attached to the emission unit (30) and captures an image of the indoor space (S). The camera (55) captures an image of respiration of the target person (T) to detect a respiratory cycle of the target person (T). In other words, the camera (55) serves as a biosensor (60).

In addition, the camera (55) detects the positions of the target portions (the mouth and nose) of the target person (T). In other words, the camera (55) serves as a position sensor (70) that identifies the positional information of the target portions of the target person (T).

Controller

The controller (80) includes a microcomputer mounted on a control board, and a memory device (specifically, a semiconductor memory) storing software for operating the microcomputer. The controller (80) includes a storage (82) and a setting unit (81). The controller (80) may include a storage (82) separate from the control board.

The storage (82) stores data including multiple types of useful substances (U) and environmental conditions associated with each of the useful substances (U). The environmental conditions associated with the useful substance (U) mean environmental conditions in which the useful substance (U) efficiently acts on the target person (T). The environmental conditions mentioned herein include the temperature and humidity of the indoor space (S) and the target portion (the airflow direction).

The useful substance (U) stored in the storage (82) may be a single substance, or may be a mixed substance in which multiple substances are mixed. The mixed substance may be different from other mixed substances in the mixing ratio of the substances contained.

The storage (82) stores data on symptoms or diseases associated with each useful substance (U), the concentration of the useful substance (U), and emission time of the useful substance (U), as well as environmental conditions associated with the useful substance (U).

A symptom or disease selected by the target person (T) is set in the setting unit (81). When a symptom or disease is set in the setting unit (81), the controller (80) selects a predetermined useful substance (U) associated with a symptom or disease stored in the storage (82) based on the symptom or disease set in the setting unit (81).

Figure 3:
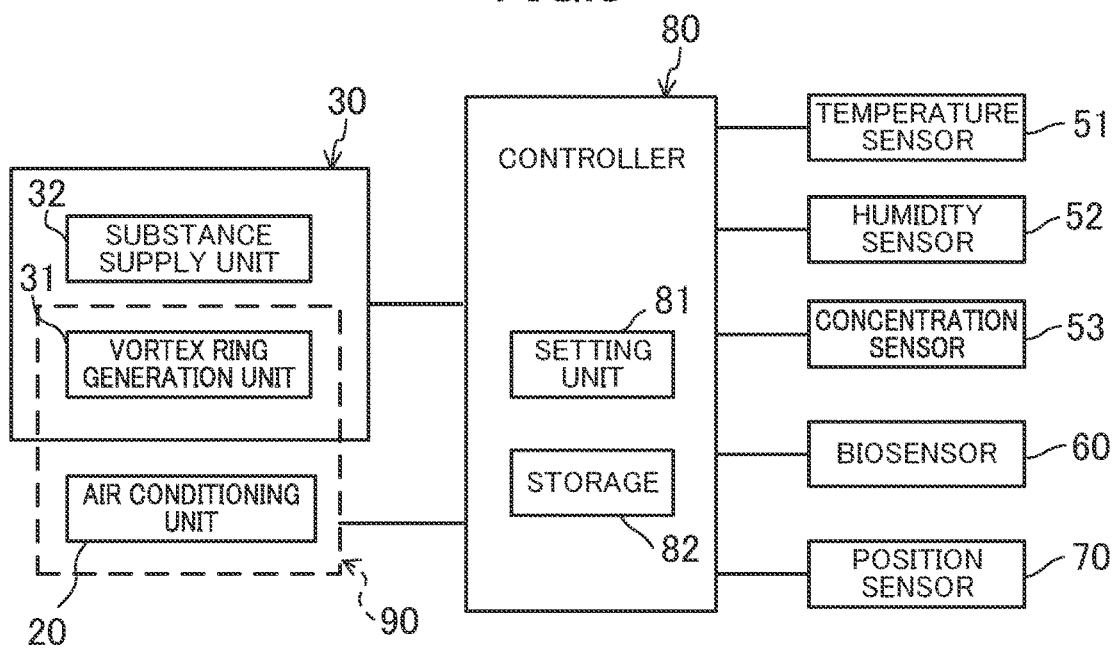
FIG. 3 is a schematic block diagram of the emission device.

As illustrated in FIG. 3, the controller (80) is connected to the emission unit (30), the environment adjustment unit (90), the temperature sensor (51), the humidity sensor (52), the concentration sensor (53), the biosensor (60), and the position sensor (70) in a wired or wireless manner, to be able to transmit and receive signals to and from them.

The controller (80) controls the emission unit (30) based on the chronobiological information. In other words, the controller (80) performs control so that an emission unit (30) emits the useful substance (U) at a timing at which the symptom of the target person (T) is likely to appear or at a timing at which the useful substance (U) is likely to act on the target person (T). The chronobiological information will be described later.

The controller (80) controls the extrusion mechanism (45) of the vortex ring generation unit (31) based on the biological information (information about a heart rate and a body temperature) detected by the biosensor (60). Thus, the vortex ring (R) containing the useful substance (U) is emitted from the vortex ring generation unit (31) of the emission unit (30). In addition, based on the respiratory cycle detected by the biosensor (60), the controller (80) makes the emission unit (30) emit the useful substance (U) at the time when the target person (T) inhales air.

The controller (80) acquires the environmental conditions associated with the useful substance (U) emitted from the emission unit (30) based on the data stored in the storage (82), and controls the environment adjustment unit (90) to meet the environmental conditions. Specifically, the controller (80) makes the vortex ring generation unit (31) emit the vortex ring (R) based on the data of the target portion stored in the storage (82). At this time, the controller (80) adjusts the direction of the movable nozzle (46) of the emission unit (30) based on the data of the target portion stored in the storage (82). Thus, the vortex ring (R) is emitted toward the target portion of the target person (T). Further, based on the temperature and humidity data stored in the storage (82), the controller (80) controls the air conditioning unit (20) so that the indoor space (S) has a predetermined temperature and humidity.

Based on the output from the concentration sensor (53), the controller (80) adjusts the amount of the useful substance (U) emitted from the emission unit (30). Specifically, from the concentration of the useful substance (U) in the indoor space (S) output from the concentration sensor (53), the controller (80) estimates the concentration of the useful substance (U) in the target portion based on the distance between the concentration sensor (53) and the target portion of the target person (T). The controller (80) adjusts the emission amount of the useful substance (U) so that the estimated concentration reaches a predetermined concentration stored in the storage (82). Thus, the concentration of the useful substance (U) supplied to the target person (T) can be maintained at a predetermined concentration.

The controller (80) makes the emission unit (30) emit the useful substance (U) so that the cumulative total of time during which the useful substance (U) is emitted from the emission unit (30) is one hour or more in one day. Thus, the useful substance (U) can be administered to the target person (T) over a long period of time.

The controller (80) may be provided in the emission unit (30) or may be separate from the emission unit (30). For example, the controller (80) may be provided in a control unit or a remote controller of the air conditioning unit (20). The controller (80) may be provided in a server device connected to a local network, the Internet, or the like, or various communications terminals (a portable terminal, a personal computer, or the like).

Chronobiological Information

Next, the chronobiological information will be described below.

The chronobiological information is information obtained in chronobiology that is a study of biological rhythms (biological clocks) inherent in organisms. The main target of study in chronobiology is the circa-rhythm that is adapted to one day, one year, tides, and the like produced by the sun and moon.

Examples of the rhythms (cycles) of organisms dealt with in chronobiology include ultradian rhythms (a few tens of minutes to a few hours), tidal rhythms (about 12.4 hours), circadian rhythms (about 24 hours), circadian rhythms (about two days), circalunar rhythms (about one month), circannual rhythms (about one year), and the like.

The study in chronobiology has shown that there are a timing at which a person is likely to develop a certain symptom and a timing at which a person is likely to absorb or metabolize a useful substance based on the biological rhythms described above.

Here, it is known from chronobiology that there is a timing at which the symptom of cough attacks in this embodiment is likely to appear due to changes in hormonal balance based on the circadian rhythm. Specifically, a cough attack is likely to occur when the parasympathetic nerve during one's sleep is dominant. In detail, a cough attack is likely to be caused during the time from dusk to dawn because endogenous steroid hormones decrease in the body. In particular, a cough attack is likely to be caused during the time of dawn. Note that endogenous steroid hormones are secreted in the body during the daytime to suppress cough attacks.

It is also known that a useful substance is highly effective for a person when the useful substance is acting at an effective concentration in the human body over a long period of time. Thus, in order to obtain a high effect of the useful substance (U), the useful substance (U) is preferably administered to the target person (T) at an effective concentration over a long period of time.

Operation

The operation of the emission device (10) will be described with reference to FIGS. 1 to 8.

Emission Operation of Vortex Ring Generation Unit

As illustrated in FIG. 2, when the controller (80) sends a signal to the vortex ring generation unit (31), the diaphragm (45*a*) of the extrusion mechanism (45) is actuated by the linear actuator (45*b*). When the diaphragm (45*a*) moves back and forth, the air in the air passage (C) is pushed out toward the emission port (44).

The substance supply port (34) is provided at an outlet end of the air passage (C). The air at the outlet end of the air passage (C) has the highest flow velocity in the air passage (C), and thus has the lowest pressure. Therefore, when the air at low pressure passes through the substance supply port (34), the useful substance (U) in the reservoir (35) is sucked into the air passage (C) due to the difference between the pressure of the air and the pressure in reservoir (35). In this way, the air containing the useful substance (U) reaches the emission port (44) immediately.

The air passing through the emission port (44) has a relatively high flow velocity, whereas the air therearound is still. For this reason, a shearing force acts on the air at the plane of discontinuity of such two types of air flows to generate a vortex flow near an outer peripheral portion of the emission port (44). The vortex flow forms a vortex ring-shaped airflow (vortex ring (R)) moving frontward from the emission port (44).

FIGS. 1 and 2 show this vortex ring (R) schematically. The vortex ring (R) containing the useful substance (U), emitted from the emission port (44), flows toward the target person (T), and hits the target portions (the mouth and nose) of the target person (T). The vortex ring (R) has properties of being less diffused and having high directivity. Thus, the vortex ring (R) containing the useful substance (U) can be reliably applied to the target portion of the target person (T).

From the emission port (44) of the emission unit (30), the vortex ring (R) is periodically or intermittently emitted depending on a vibration cycle of the diaphragm (45*a*). In addition, the flow velocity for the vortex ring (R) changes depending on the displacement amount of the diaphragm (45*a*). The controller (80) may change the emission cycle and the emission speed for the vortex ring (R) by changing the vibration cycle and the displacement amount of the diaphragm (45*a*).

Control Based on Chronobiological Information

When the target person (T) selects his/her symptom or disease, the selected symptom or disease is set in the setting unit (81) of the controller (80), and the operation of the emission device (10) is started. In this embodiment, the target person (T) selects asthma as a disease.

Figure 4:
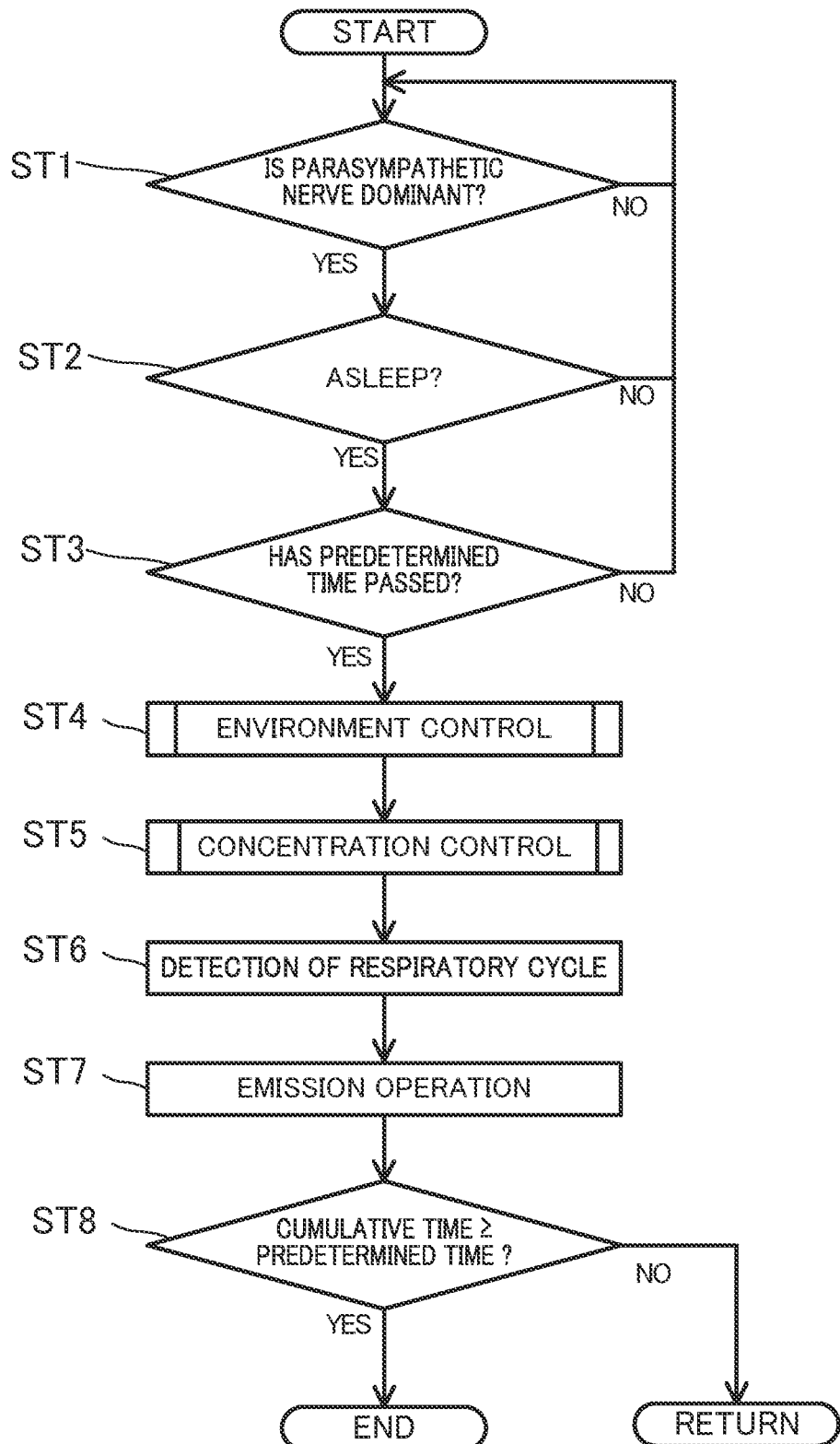
FIG. 4 is a flowchart of control of the emission device based on chronobiological information.

As illustrated in FIG. 4, when the disease is asthma, and the emission device (10) is in an operating state, the controller (80) determines whether or not the parasympathetic nerve of the target person (T) is dominant (step ST1). Specifically, the controller (80) acquires information on the RR interval of the heart rate from the biosensor (60) in the contact sensor (54) to determine whether or not the parasympathetic nerve of the target person (T) is dominant.

If the parasympathetic nerve of the target person (T) is dominant (YES in step ST1), the controller (80) determines whether or not the target person (T) is asleep (step ST2). Specifically, the controller (80) acquires information on the heart rate and the body temperature from the biosensor (60) in the contact sensor (54) to determine whether or not the target person (T) is asleep. Accordingly, it can be determined based on the chronobiological information that the target person (T) who is asleep and whose parasympathetic nerve is dominant is likely to get a cough attack.

If the target person (T) is asleep (YES in step ST2), the controller (80) determines whether or not the current time has passed a predetermined time (step ST3). In this embodiment, the predetermined time is midnight. Thus, the useful substance (U) can be administered to the target person (T), before he/she gets a cough attack, who is likely to get a cough attack at dawn (e.g., around 4 a.m.). In this embodiment, the predetermined time is set to midnight, but the predetermined time may be set to another time depending on the symptom of the target person (T).

If the current time has passed the predetermined time (YES in step ST3), the controller (80) controls the environment adjustment unit (90) (step ST4). Specifically, the controller (80) acquires the environmental conditions associated with the predetermined useful substance (U) based on the data stored in the storage (82), and controls the environment adjustment unit (90) to meet the environmental conditions.

Thus, the information on the environmental conditions in which the predetermined useful substance (U) efficiently acts on the target person (T) is stored in the storage (82), whereby an environment in which the predetermined useful substance (U) can be efficiently administered to the target person (T) is prepared. Details of the environment adjustment unit (90) will be described later.

Next, the controller (80) adjusts the emission amount of the predetermined useful substance (U) based on the output from the concentration sensor (53) (step ST5). The concentration of the useful substance (U) in this embodiment is 0.1 ppb to 1000 ppb. The concentration control based on the output from the concentration sensor (53) will be also described later.

Next, the controller (80) detects a respiratory cycle of the target person (T) (step ST6). Specifically, the controller (80) acquires information from the biosensor (60) in the camera (55) to detect the respiratory cycle of the target person (T).

Next, the controller (80) makes the emission unit (30) emit the predetermined useful substance (U) toward the target portion of the target person (T) according to the respiratory cycle of the target person (T) (step ST7). Specifically, the controller (80) allows the vortex ring generation unit (31) of the emission unit (30) to generate an airflow (vortex ring (R)) toward the mouth and nose of the target person (T).

In this way, the predetermined useful substance (U) is emitted to the mouth and nose of the target person (T), whereby the predetermined useful substance (U) acts on the nasal mucosa and respiratory mucosa of the target person (T) and is absorbed into the body. Then, the concentration of the useful substance (U) in the blood increases. Consequently, the symptom of cough attack of the target person (T) is suppressed. In addition, the vortex ring (R) is emitted according to the respiratory cycle, and thus the amount of the useful substance (U) used can be reduced.

Next, the controller (80) determines whether or not the cumulative total of time during which the predetermined useful substance (U) is emitted from the emission unit (30) is more than or equal to a predetermined time in one day (step ST8). The predetermined time in this embodiment is four hours. Thus, the predetermined useful substance (U) can be administered to the target person (T) over a long period of time (one hour or more). In this embodiment, the predetermined time is set to four hours, but the predetermined time may be set to another length depending on the symptom of the target person (T).

Here, the cumulative total of time during which the useful substance (U) is emitted from the emission unit (30) means the cumulative total of time during which the emission unit (30) performs emission operation. For example, even if the emission unit (30) stops emission operation due to the target person (T) waking up during the operation of the emission device (10), the time of emission operation performed before the target person (T) wakes up and the time of emission operation performed after the target person (T) goes back to sleep again are summed to calculate the cumulative total of time.

If the cumulative total of time during which the predetermined useful substance (U) is emitted from the emission unit (30) is more than or equal to the predetermined time in one day (YES in step ST8), the controller (80) stops the operation of the emission device (10). If the cumulative total of time during which the predetermined useful substance (U) is emitted from the emission unit (30) is less than the predetermined time in one day (NO in step ST8), the controller (80) returns to step ST1.

Control of Environment Adjustment Unit

The control of the environment adjustment unit (90) in step ST4 of FIG. 4 will be described with reference to FIGS. 5 to 7. The environment adjustment unit (90) performs at least one of temperature control, humidity control, or airflow control in the indoor space (S). When two or more controls among the temperature control, the humidity control, and the airflow control are performed, the controls may be performed in any order.

Temperature Control

Figure 5:
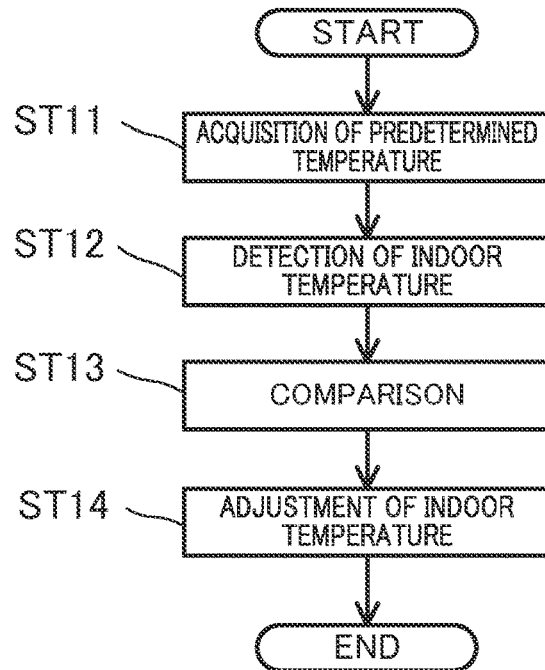
FIG. 5 is a flowchart of temperature control.

As illustrated in FIG. 5, the controller (80) acquires a predetermined temperature associated with the predetermined useful substance (U) based on the data stored in the storage (82) (step ST11). Next, the controller (80) detects a temperature of the indoor space (S) based on output from the temperature sensor (51) (step ST12). Next, the controller (80) compares the predetermined temperature acquired from the data in the storage (82) with the temperature of the indoor space (S) (step ST13).

Next, based on the result of the comparison in step ST13, the controller (80) controls the environment adjustment unit (90) so that the temperature of the indoor space (S) reaches a predetermined temperature (step ST14). Specifically, the controller (80) makes the air conditioning unit (20) adjust the temperature of the air in the indoor space (S) to the predetermined temperature. Thus, the temperature of the indoor space (S) can be adjusted to the temperature at which the target person (T) easily absorbs the predetermined useful substance (U).

Humidity Control

Figure 6:
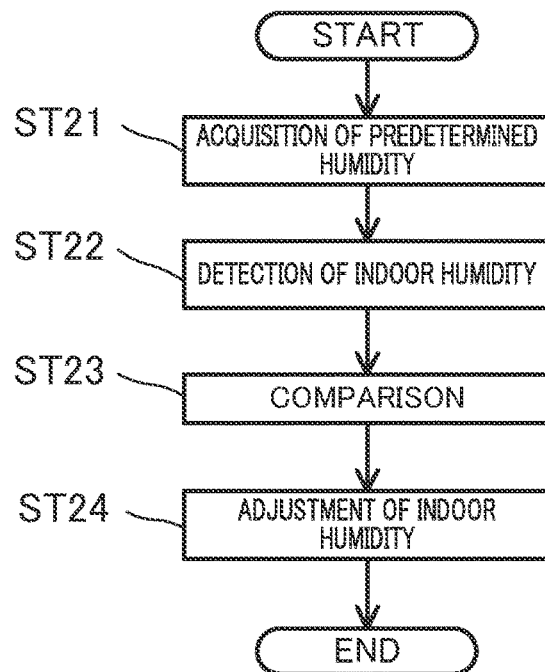
FIG. 6 is a flowchart of humidity control.

As illustrated in FIG. 6, the controller (80) acquires a predetermined humidity associated with the predetermined useful substance (U) based on the data stored in the storage (82) (step ST21). Next, the controller (80) detects a humidity of the indoor space (S) based on an output from the humidity sensor (52) (step ST22). Then, the controller (80) compares the predetermined humidity acquired from the data in the storage (82) with the humidity of the indoor space (S) (step ST23).

Next, based on the result of the comparison in step ST23, the controller (80) controls the environment adjustment unit (90) so that the humidity of the indoor space (S) reaches a predetermined humidity (step ST24). Specifically, the controller (80) makes the air conditioning unit (20) adjust the humidity of the indoor space (S) to the predetermined humidity. Thus, the humidity of the indoor space (S) can be adjusted to the humidity at which the target person (T) easily absorbs the predetermined useful substance (U).

Airflow Control

Figure 7:
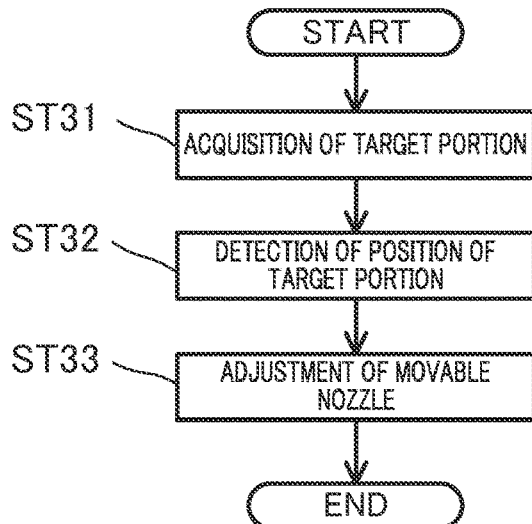
FIG. 7 is a flowchart of airflow control.

As illustrated in FIG. 7, the controller (80) acquires target portions associated with the predetermined useful substance (U) based on the data stored in the storage (82) (step ST31). Next, the controller (80) detects positions of the target portions of the target person (T) by the position sensor (70) (step ST32). Specifically, the controller (80) detects positions of the mouth and nose of the target person (T) from the information in the camera (55).

Next, the controller (80) adjusts the direction of the movable nozzle (46) of the vortex ring generation unit (31) so that the predetermined useful substance (U) is emitted toward the target portions of the target person (T) (step ST33). In this embodiment, the movable nozzle (46) is adjusted to be directed toward the mouth and nose of the target person (T). Thus, even if the target person (T) turns over in sleep to change its posture for example, the movable nozzle (46) can follow the movement of the target portions.

Concentration Control Based on Output from Concentration Sensor

The concentration control based on output from the concentration sensor (53) in step ST5 of FIG. 4 will be described with reference to FIG. 8.

Figure 8:
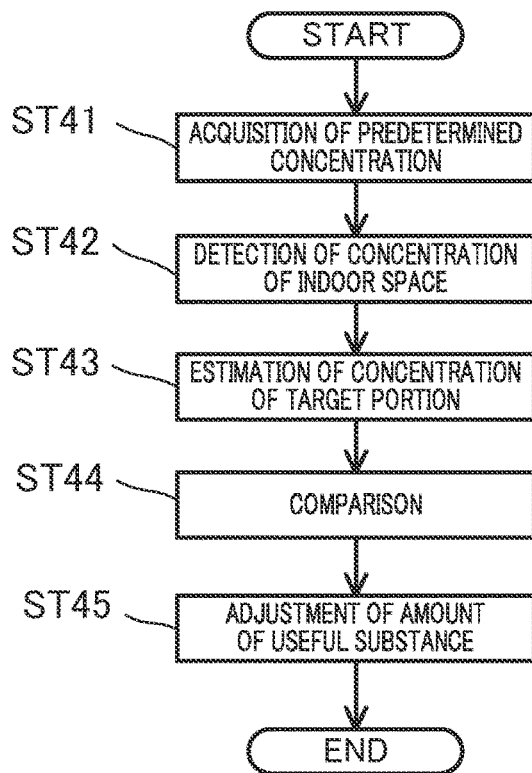
FIG. 8 is a flowchart of concentration control.

As illustrated in FIG. 8, the controller (80) acquires a predetermined concentration associated with a predetermined useful substance (U) based on the data stored in the storage (82) (step ST41). Next, the controller (80) detects a concentration of the useful substance (U) in the indoor space (S) at the position of the concentration sensor (53) based on the output from the concentration sensor (53) (Step ST42). Next, the controller (80) estimates a concentration of the useful substance (U) at the target portion of the target person (T) based on the detected concentration in the indoor space (S) (Step ST43). Next, the controller (80) compares the predetermined concentration acquired from the data in the storage (82) with the estimated concentration at the target portion (step ST44).

Next, based on the result of the comparison in step ST44, the controller (80) adjusts the amount of the useful substance (U) supplied from the substance supply unit (32) so that the estimated concentration reaches the predetermined concentration (step ST45). Thus, the concentration of the useful substance (U) supplied to the target person (T) can be maintained at a predetermined concentration. In addition, the useful substance (U) of which the amount has been adjusted for the target person (T) can be supplied, and thus the amount of the useful substance (U) to be used can be reduced.

Features of First Embodiment

The feature (1) of this embodiment is that the emission device (10) includes the controller (80) that controls the emission unit (30) based on the chronobiological information.

According to this configuration, the useful substance (U) can be emitted at an optimum timing for the target person (T) such as a timing at which the symptom of the target person (T) is likely to appear or a timing at which the useful substance (U) is likely to act on the target person (T). Thus, the useful substance (U) can be efficiently administered to the target person (T) at an effective timing.

The feature (2) of this embodiment is that the controller (80) makes the emission unit (30) emit the useful substance (U) so that the cumulative total of time during which the useful substance (U) is emitted from the emission unit (30) is one hour or more in one day.

Here, for inhalers used to administer a drug for respiratory diseases and the like, existing concepts of administration for oral drugs are used to determine the concentration, spray volume, spray time, and number of inhalations of the useful substance. In particular, regarding the spray time, spraying is performed in a short time such as about minutes to several tens of minutes. In contrast, a person can obtain a high effect of the useful substance when the concentration of the useful substance in the body is maintained at an effective level over a long period of time. Therefore, typical inhalers may not cause the useful substance (U) to be efficiently administered to the target person (T). According to this configuration, the useful substance (U) can be administered to the target person (T) over a long period of time, and thus the useful substance (U) can be efficiently administered to the target person (T).

In addition, the useful substance (U) can be administered to the target person (T) over a long period of time, and thus some types of useful substances (U) can be administered at lower concentrations than those at which they are administered over a short period of time. Thus, side effects of the useful substance (U) can be reduced.

The feature (3) of this embodiment is that the controller (80) adjusts the emission amount of the useful substance (U) based on the output from the concentration sensor (53).

According to this configuration, the concentration of the useful substance (U) supplied to the target person (T) can be maintained at a predetermined concentration. In addition, the useful substance (U) of which the amount has been adjusted for the target person (T) can be supplied, and thus the amount of the useful substance (U) to be used can be reduced.

The feature (4) of this embodiment is that the controller (80) makes the emission unit (30) emit the useful substance (U) based on the biological information obtained by the biosensor (60).

According to this configuration, the controller (80) can determine a state of the target person (T) based on the biological information of the target person, and the useful substance (U) can be emitted to the target person (T) at an optimum timing.

The feature (5) of this embodiment is that the biosensor (60) detects a respiratory cycle of the target person (T), and the controller (80) makes the emission unit (30) emit the useful substance (U) at the time when the target person (T) inhales air.

According to this configuration, the useful substance (U) is emitted at the time when the target person (T) inhales air, and thus the amount of the useful substance (U) used can be reduced.

The feature (6) of this embodiment is that the emission unit (30) includes the vortex ring generation unit (31) that emits an airflow in a vortex ring shape.

According to this configuration, the useful substance (U) applied to the vortex ring (R) generated by the vortex ring generation unit (31) can be efficiently administered to the target person (T). The vortex ring (R) is less diffused and has high directivity, and thus, the useful substance (U) can be reliably administered to the target person (T).

Further, even if two or more persons are present in the indoor space (S), the useful substance (U) can be administered to the target person (T) only. Thus, the useful substance (U) is not administered to a person other than the target person (T), whereby the burden on the person other than the target person (T) is also reduced.

In addition, the useful substance (U) is emitted only around the target portion of the target person (T), and thus the useful substance (U) less adheres to a wall or clothes, thereby reducing coloring thereon.

The feature (7) of this embodiment is that the controller (80) acquires the environmental conditions associated with the useful substance (U) emitted from the emission unit (30) based on the data stored in the storage (82) and controls the emission unit (30) and the air conditioning unit (20) to meet the environmental conditions.

According to this configuration, if the information on the environmental condition in which the predetermined useful substance (U) efficiently acts on the target person (T) is stored in the storage (82), an environment in which the useful substance (U) can be efficiently administered to the target person (T) is prepared.

The feature (8) of this embodiment is that the controller (80) makes the emission unit (30) emit the useful substance (U) when the target person (T) is sleeping. According to this configuration, the target person (T) can naturally ingest the useful substance (U) in normal life. Therefore, the burden on the target person (T) can be reduced.

Here, when the parasympathetic nerve is dominant during one's sleep, the muscles of the target person (T) are loose and the blood vessels are dilated. Thus, the blood flows easily, and nutrition, oxygen, and the like are easily distributed throughout the whole body. The controller (80) makes the emission unit (30) emit the useful substance (U) when the target person (T) is sleeping. Thus, the useful substance (U) taken into the blood of the target person (T) is easily absorbed and metabolized by the target person (T).

Variations of First Embodiment

The first embodiment may be modified as follows. The configurations described in the following variations can also be applied to the second to fourth embodiments which will be described in detail later.

First Variation

An emission device (10) of this embodiment may use salbutamol (short-acting β2 stimulant) as a predetermined useful substance (U) for a disease of asthma.

In this variation, the concentration of the useful substance (U) stored in a storage (82) is 0.01%. In this variation, the predetermined temperature of an indoor space (S) stored in the storage (82) is more than or equal to 23° C., and the predetermined humidity of the indoor space (S) is more than or equal to 65% RH.

Also in this variation, the emission device (10) can be operated by the control based on chronobiological information. In this case, in step ST14 of the temperature control by the environment adjustment unit (90), the controller (80) makes the air conditioning unit (20) adjust the temperature of the air in the indoor space (S) to 23° C. or more. In step ST24 of the humidity control by the environment adjustment unit (90), the controller (80) makes the air conditioning unit (20) adjust the humidity of the air in the indoor space (S) to 65% RH or more.

In step ST45 of the control based on the output from the concentration sensor (53), the amount of the useful substance (U) supplied from the substance supply unit (32) is adjusted so that the estimated concentration reaches 0.01%. This can provide advantages that are the same as, or similar to, those of the first embodiment.

Second Variation

An emission device (10) of this variation may be used for a target person (T) having a sleep disorder as a disease.

A contact sensor (54) of the emission device (10) of this variation is put on a head of the target person (T). The contact sensor (54) detects signals that underlie the brain wave and heart rate. A controller (80) makes an emission unit (30) emit a vortex ring (R) containing a useful substance (U) toward a target portion of the target person (T) based on the information on the brain wave and heart rate detected by the contact sensor (54). In this variation, the target portion of the target person (T) includes his/her mouth and nose.

The useful substance (U) in this variation includes lavender essential oil and cedrol (cedarwood) essential oil. The concentration of the useful substance (U) is 0.1 ppb to 1000 ppb.

Here, the sleep disorder in this variation may relate to disturbance of a sleep cycle, which is a kind of ultradian rhythms. The sleep cycle is a cycle of repetition of REM sleep and non-REM sleep observed in human sleep. This sleep cycle is repeated with a cycle of about 90 minutes. REM sleep is a sleep state in which the body rests, and is a state of light sleep close to wakefulness. Non-REM sleep is a sleep state in which the brain rests, and is a state of deep sleep.

Control Based on Chronobiological Information

When the emission device (10) is in an operating state, the controller (80) determines whether or not the target person (T) is in an REM sleep state. Specifically, the controller (80) acquires information on sleep depth from the brain wave and heart rate detected by the contact sensor (54) to determine whether or not the target person (T) is in an REM sleep state. If the target person (T) is in an REM sleep state, the controller (80) controls an environment adjustment unit (90) (step ST4). The operation after step ST4 is the same as that in the first embodiment.

The controller (80) makes the emission unit (30) emit the useful substance (U) when the target person (T) is in an REM sleep. Thus, the target person (T) can take the useful substance (U) into his/her body at an optimum timing. The predetermined useful substance (U) is applied to the mouth and nose of the target person (T) when the target person (T) is in an REM sleep state, whereby the useful substance (U) acts on the nasal mucosa and respiratory mucosa of the target person (T), and the concentration of the useful substance (U) in blood increases. This leads to deep sleep of the target person (T). The target person (T) is in a deep sleep state, whereby a sleep disorder is improved, and also retention of memory, promotion of growth, and a skin-beautifying effect can be obtained.

Third Variation

An emission device (10) of this embodiment may be used for a target person (T) having premenstrual syndrome (PMS) as a disease.

In this variation, a contact sensor (54) of the emission device (10) is put on an arm of the target person (T). The contact sensor (54) detects signals that underlie the heart rate and body temperature. A controller (80) makes an emission unit (30) emit a vortex ring (R) containing a useful substance (U) toward a target portion of the target person (T) based on the information on the heart rate and body temperature detected by the contact sensor (54).

The useful substance (U) in this variation includes lemongrass essential oil and geranium essential oil. The concentration of the useful substance (U) is 0.1 ppb to 1000 ppb.

Here, the premenstrual syndrome in this variation appears between 3 days to 10 days before the start of menstruation, which is the late stage of a menstrual cycle, and disappears with the start of menstruation. The premenstrual syndrome is a combination of physical and mental symptoms. The premenstrual syndrome occurs due to changes in hormonal balance based on the circalunar rhythm, which is a one month cycle.

Control Based on Chronobiological Information

When the emission device (10) is in an operating state, the controller (80) determines whether or not the target person (T) is in the state before the predetermined number of days of the start of menstruation. In this variation, the predetermined number of days is five days. Specifically, the controller (80) acquires information on the body temperature from the contact sensor (54) and acquires information on a body temperature cycle in the last one month. The controller (80) estimates a menstruation cycle from the acquired body temperature cycle to determine whether or not the target person (T) is in the state before five days of the start of menstruation. In this variation, the predetermined number of days is five days, but may be different days depending on the state of the target person (T).

If the target person (T) is in the state before the predetermined number of days of the start of menstruation, the controller (80) determines whether or not the target person (T) is in a rest state. Specifically, the controller (80) acquires information on the heart rate from the contact sensor (54) to determine whether or not the target person (T) is in a rest state. Here, the rest state is a state in which the target person is not undergoing strenuous exercise, e.g., he/she is sleeping or working at a desk.

If the target person (T) is in a rest state, the controller (80) controls an environment adjustment unit (90) (step ST4). The operation after step ST4 is the same as that in the first embodiment.

As such, the controller (80) makes the emission unit (30) emit the predetermined useful substance (U) at an optimum timing before the target person (T) develops a premenstrual syndrome. Accordingly, a symptom of the premenstrual syndrome can be reduced.

Fourth Variation

An emission device (10) of this embodiment may be used for a target person (T) having morning hypertension as a disease.

The emission device (10) in this variation has the same configuration as those of the above embodiments. In this variation, the target portion of the target person (T) includes his/her mouth and nose. The useful substance (U) in this variation includes marjoram essential oil, geranium essential oil, lavender essential oil, lemon essential oil, petitgrain essential oil, and eucalyptus lemon essential oil. The concentration of the useful substance (U) is 0.1 ppb to 1000 ppb. Note that the concentration of the useful substance (U) of this variation is lower than that of the useful substance (U) used for inhalation in a hospital.

Here, in the morning hypertension in this variation, a blood pressure increases in the early morning due to changes in hormonal balance based on the circadian rhythm. In general, a person has a low blood pressure during sleep because parasympathetic nerves are dominant. At dawn, autonomic nerves switch from parasympathetic nerves to sympathetic nerves, and corticosteroids contract blood vessels to increase the blood pressure. In the morning hypertension, this increase in a blood pressure at dawn is extreme.

Control Based on Chronobiological Information

When the emission device (10) is in an operating state, the controller (80) determines whether or not the target person (T) is asleep. If the target person (T) is asleep, the controller (80) determines whether or not the current time has passed a predetermined time. The predetermined time in this variation is midnight. In this variation, the predetermined time is set to the midnight, but the predetermined time may be set to another time depending on the symptom of the target person (T).

If the current time has passed the predetermined time, the controller (80) controls an environment adjustment unit (90) (step ST4). The operation after step ST4 is the same as that in the first embodiment.

Thus, the useful substance (U) can be administered at an optimum timing before the development of the disease to the target person (T) who is likely to develop hypertension at dawn. In addition, the useful substance (U) can be administered to the target person (T) over a long period of time. Thus, a symptom of morning hypertension can be reduced.

Second Embodiment

A second embodiment will be described. An emission device (10) of this embodiment is configured such that an emission unit (30) and an air conditioning unit (20) in the emission device (10) of the first embodiment are integral with each other. Thus, the following description will be focused on the differences of the emission device (10) of this embodiment from the emission device (10) of the first embodiment.

Figure 9:
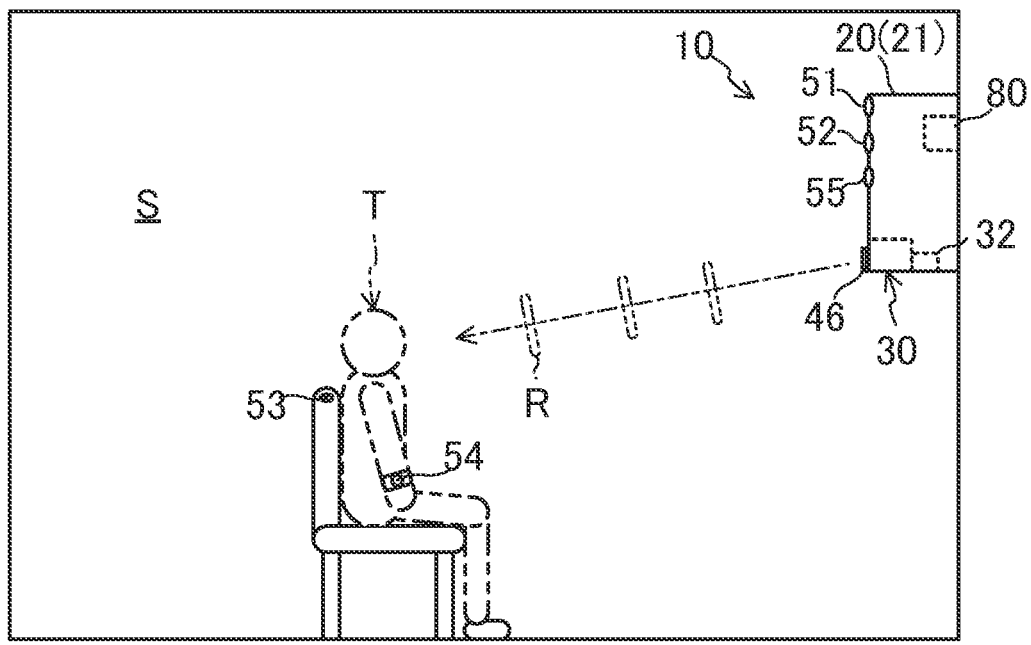
FIG. 9 is a diagram illustrating a schematic overall configuration of an emission device of a second embodiment.

As illustrated in FIG. 9, a target person (T) sits on a chair in an indoor space (S) for example. The emission unit (30) of the emission device (10) is provided in an indoor unit (21) of the air conditioning unit (20). Specifically, a vortex ring generation unit (31) and a substance supply unit (32) are provided in the indoor unit (21). An emission port (44) of the vortex ring generation unit (31) is provided at a blow-out port of the indoor unit (21).

A vortex ring (R) generated by the vortex ring generation unit (31) is emitted from the blow-out port of the indoor unit (21) toward a target portion of the target person (T). In other words, the air conditioning unit (20) serves as the emission unit (30) and also serves as an environment adjustment unit (90).

The air conditioning unit (20) adjusts environmental conditions of the indoor space (S). Specifically, the air conditioning unit (20) adjusts a temperature, humidity, and airflow direction of air in the indoor space (S). A controller (80) acquires the environmental conditions (a temperature, humidity, and airflow direction) associated with the useful substance (U) stored in the storage (82), and controls the air conditioning unit (20) to meet the environmental conditions.

A camera (55) as a biosensor is attached to the indoor unit (21). The camera (55) is directed toward the indoor space (S) and captures an image of the indoor space (S). A concentration sensor (53) is disposed above the chair on which the target person (T) sits.

Also in this variation, the controller (80) controls the emission unit (30) based on the chronobiological information, and thus the useful substance (U) can be emitted at an optimum timing for the target person (T) such as a timing at which the symptom of the target person (T) is likely to appear or a timing at which the useful substance (U) is likely to act on the target person (T). Thus, the useful substance (U) can be efficiently administered to the target person (T) at an effective timing.

Third Embodiment

A third embodiment will be described below. An emission device (10) of this embodiment is configured such that an emission unit (30) in the emission device (10) of the first embodiment includes a sprayer (38) of an electrostatic spray type instead of a vortex ring generation unit (31). Thus, the following description will be focused on the differences of the emission device (10) of this embodiment from the emission device (10) of the first embodiment.

Figure 10:
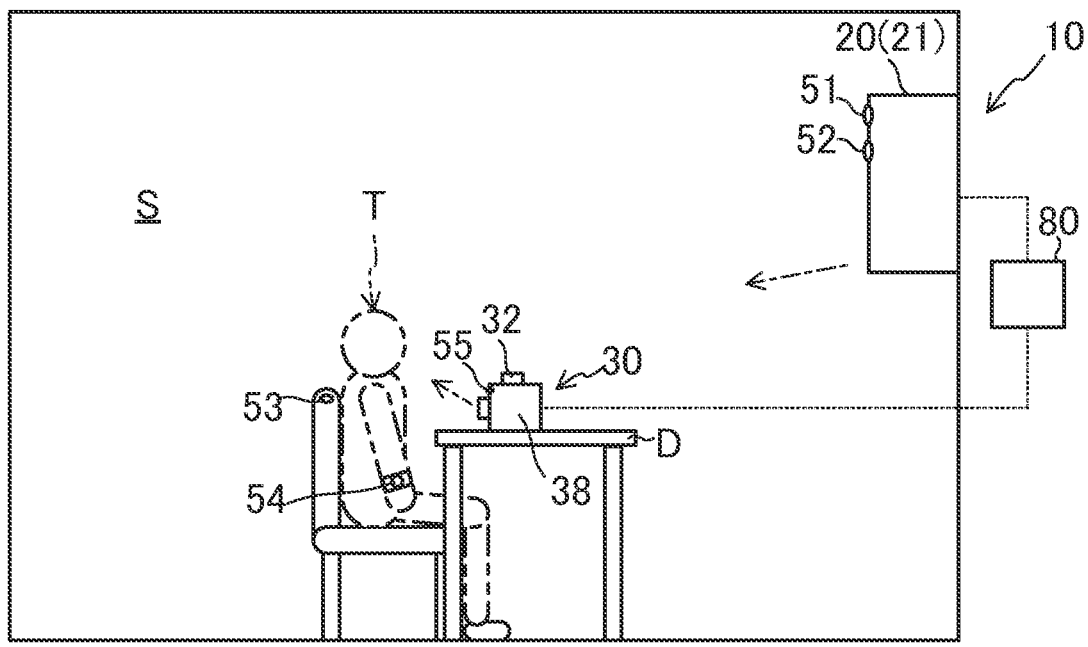
FIG. 10 is a diagram illustrating a schematic overall configuration of an emission device of a third embodiment.

As illustrated in FIG. 10, a target person (T) sits on a chair in an indoor space (S), for example. The emission device (10) is disposed on a desk (D) placed in front of the target person (T). The emission unit (30) of the emission device (10) includes the sprayer (38) of an electrostatic spray type. The sprayer (38) includes a spray nozzle and a counter electrode. The counter electrode is disposed around the spray nozzle. In this embodiment, the substance supply unit (32) stores a liquid useful substance (U).

In this embodiment, when a high voltage is applied to the spray nozzle and the outside, a potential difference is generated between charged liquid and the counter electrode at the distal end of the spray nozzle, and an electric field is generated. The liquid on the distal end of the spray nozzle is pulled by the electric field and ejected in a liquid thread state. Afterward, the liquid ejected in a liquid thread state splits into fine droplets. The liquid is charged and repulse each other such that the droplets are diffused and sprayed.

According to this configuration, the useful substance (U) emitted from the emission device (10) can be made into fine particles by the sprayer (38) of an electrostatic spray type. Thus, the useful substance (U) can be efficiently administered to the target person (T). In addition, the useful substance (U) emitted from the sprayer (38) of an electrostatic spray type is charged, and thus the useful substance (U) is attracted to a target portion of the target person (T) serving as a ground. Thus, the useful substance (U) can be sprayed and concentrated on the target portion of the target person (T).

Also in this embodiment, the controller (80) controls the emission unit (30) based on the chronobiological information, and thus the useful substance (U) can be emitted at an optimum timing for the target person (T) such as a timing at which the symptom of the target person (T) is likely to appear or a timing at which the useful substance (U) is likely to act on the target person (T). Thus, the useful substance (U) can be efficiently administered to the target person (T) at an effective timing.

Fourth Embodiment

A fourth embodiment will be described below. An emission device (10) of this embodiment is configured such that an emission device (10) of the first embodiment includes a controller (80) having a modified configuration. Thus, the following description will be focused on the differences of the emission device (10) of this embodiment from the emission device (10) of the first embodiment.

Figure 11:
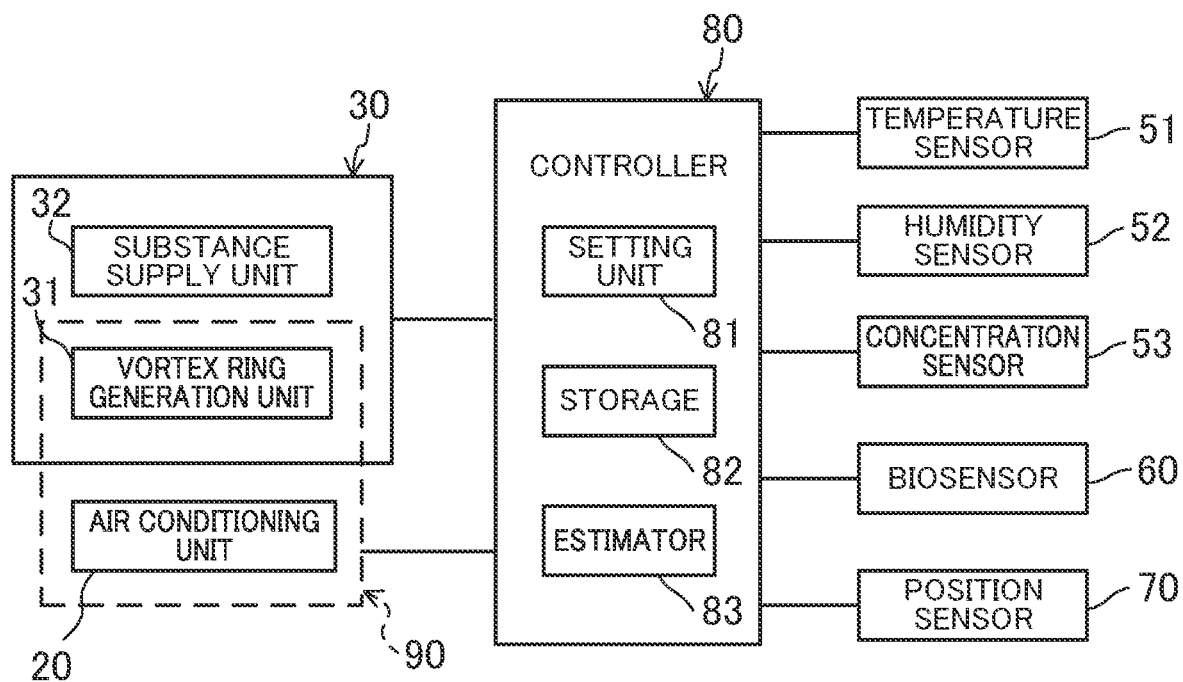
FIG. 11 corresponds to FIG. 3 and illustrates an emission device of a fourth embodiment.

As illustrated in FIG. 11, the controller (80) includes a setting unit (81), a storage (82), and an estimator (83). The storage (82) stores an optimum emission timing for each useful substance (U) in a circadian rhythm in addition to the data stored in the first embodiment.

The estimator (83) estimates a circadian rhythm of the target person (T) from the heart rate detected by a contact sensor (54). Specifically, the estimator (83) acquires information on an RR interval of the heart rate detected by the contact sensor (54), and determines from changes in the RR interval which one of the sympathetic nerve or the parasympathetic nerve is dominant in the autonomic nerve system of the target person (T).

Here, melatonin, which is a hormone with hypnosis, is more secreted in the body when the parasympathetic nerve is dominant, while being less secreted in the body when the sympathetic nerve is dominant. As such, there is a correlation between the amount of melatonin secreted in the body and the state of the autonomic nerve system.

Further, the amount of melatonin secreted in the body changes in a cycle of about 24 hours. Specifically, melatonin is secreted most during sleep and is less secreted after awakening. In other words, the change in secreted amount of melatonin follows a circadian rhythm. Thus, the estimator (83) can estimate a circadian rhythm of the target person (T) from the state of the autonomic nervous system of the target person (T) via the change in amount of melatonin secreted in the body.

Next, the control based on the chronobiological information of this embodiment will be described below. When the target person (T) selects his/her symptom or disease, the selected symptom or disease is set in the setting unit (81) of the controller (80), and the operation of the emission device (10) is started. In this embodiment, the target person (T) selects a sleep disorder as a disease.

Figure 12:
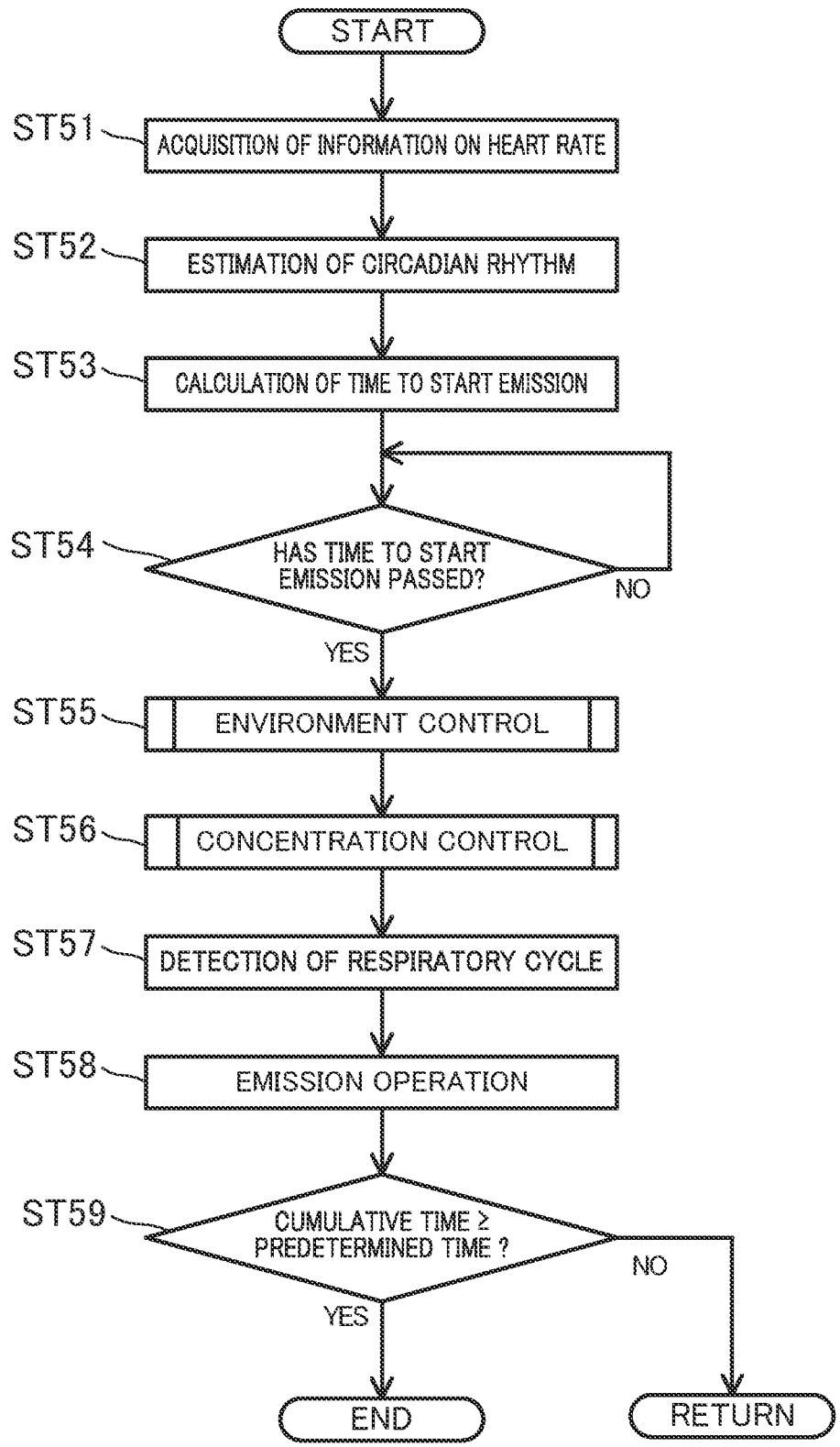
FIG. 12 corresponds to FIG. 4 and illustrates the emission device of the fourth embodiment.

As illustrated in FIG. 12, when the emission device (10) is in an operating state, the controller (80) acquires information on the heart rate from the contact sensor (54) (step ST51). Next, in step ST52, the estimator (83) of the controller (80) estimates a circadian rhythm of the target person (T) from the information on the heart rate.

Next, in step ST53, the controller (80) acquires information on an optimum timing for emitting the useful substance (U) based on the data stored in the storage (82), and calculates a time to start emitting the useful substance (U) in the circadian rhythm of the target person (T) estimated by the estimator (83).

In step ST54, the controller (80) determines whether or not the calculated time to start emission has come. If the time to start emission has come (YES in step ST54), the controller (80) controls an environment adjustment unit (90) (step ST55). The operations after step ST55 (operations from step ST55 to step ST59) are the same as those from step ST4 to step ST8 in the first embodiment.

As such, in this embodiment, the controller (80) estimates the circadian rhythm of the target person (T) from the heart rate detected by the biosensor (60), and the emission unit (30) emits the useful substance (U) based on the estimated circadian rhythm. Thus, the useful substance can be administered to the target person (T) at an optimum timing for the state of the target person (T).

Variation of Fourth Embodiment

The estimator (83) of the controller (80) of this embodiment may estimate the circadian rhythm of the target person (T) from the body temperature (skin temperature) detected by the contact sensor (54). Specifically, the estimator (83) acquires information on a skin temperature detected by the contact sensor (54), and estimates a change in core body temperature of the target person (T) from a change in skin temperature.

Here, the core body temperature means a body temperature of a core portion of the body. The core body temperature is usually around 37° C. and is higher than the skin temperature. The core body temperature changes in a cycle of about 24 hours. Specifically, the core body temperature is highest in the afternoon, while being lowest at dawn. In other words, the change in core body temperature follows a circadian rhythm. Thus, the estimator (83) can estimate a circadian rhythm of the target person (T) from the change in skin temperature of the target person (T) via the change in core body temperature. As changes in the body caused by changes in the core body temperature, drowsiness appears as the core body temperature decreases from the highest state, whereas the body is awakened and the activity in the body is increased as the core body temperature increases from the lowest state.

Other Embodiments

The above embodiments may also have the following configurations.

The emission unit (30) of the emission device (10) of the first and third embodiments is placed on furniture (a shelf and a desk) in a room, but may be of a floor-mounted type where the emission unit (30) is installed on a floor surface or may be a wall-mounted type where the emission unit (30) is installed on a wall surface. Further, the emission device (10) of the first and third embodiments may be installed on a ceiling.

The air conditioning unit (20) of each of the embodiments may be an air purifier that purifies indoor air (room air) or a humidifier that humidifies an indoor space.

The emission device (10) of each of the embodiments may include an emission unit (30) having both a vortex ring generation unit (31) and a sprayer (38).

The emission unit (30) of the third embodiment may be integral with an air conditioning unit (20).

The vortex ring generation unit (31) of the emission unit (30) of the first embodiment may not necessarily include the extrusion mechanism (45) having the linear actuator (45*b*) and the diaphragm (45*a*). For example, the extrusion mechanism (45) may be a piston that reciprocates to convey air in the air passage (C).

In the emission device (10) of each of the embodiments, the adjustment of the airflow by the environment adjustment unit (90) may be performed in a way using other than the vortex ring generation unit (31). For example, an airflow direction in the indoor unit may be adjusted to make an airflow in the indoor space (S) adjusted.

The controller (80) of each of the embodiments performs emission of the useful substance (U) when the target person (T) is asleep or works at the desk, but may perform emission of the useful substance (U) during a period of time in which the useful substance (U) can be efficiently administered (e.g., during watching of a movie, reading, eating, or the like) depending on a symptom of the target person (T).

The controller (80) of each of the embodiments performs emission of the useful substance (U) toward the mouth and nose, but may perform emission toward other target portions depending on a disease or symptom of the target person (T). Examples of the other target portions include skin, a head (scalp and hair root), and eyes (cornea and conjunctiva).

The contact sensor (54) of each of the embodiments may detect biological information (e.g., blood pressure, blood sugar, skin moisture, body motion, or the like) other than a body temperature and a heart rate depending on the symptom.

The camera (55) of each of the embodiments may detect biological information (e.g., a heart rate, a pulse wave, or a facial color) other than the respiratory cycle of the target person (T) depending on the symptom.

While the embodiments and variations thereof have been described above, it will be understood that various changes in form and details may be made without departing from the spirit and scope of the claims. The embodiments, the variations, and the other embodiments may be combined and replaced with each other without deteriorating intended functions of the present disclosure.

As described above, the present disclosure is useful for an emission device.

The invention claimed is:

1. An emission device, comprising:
an emission unit configured to emit a useful substance through a nozzle to a space where a target person is present;
a controller configured to control the emission unit based on a circadian rhythm of the target person, and a symptom or disease selected by the target person being settable in the controller,
the controller including a storage configured to store data on
a plurality of useful substances,
symptoms or diseases associated with each of the plurality of useful substances, and
an optimum emission timing for each of the plurality of useful substances in the circadian rhythm,
the controller being configured to
determine which one of a sympathetic nerve or a parasympathetic nerve is dominant in an autonomic nerve system of the target person based on a change in an RR interval of a heart rate of the target person,
estimate the circadian rhythm of the target person in the autonomic nerve system from a result of the determination,
acquire, based on the data stored in the storage, an associated useful substance that is one useful substance included in the plurality of useful substances and is associated with the symptom or disease set in the controller and information on the optimum emission timing for emitting the associated useful substance in the circadian rhythm estimated,
determine a time to start emitting the associated useful substance based on the optimum emission timing for emitting the associated useful substance in the circadian rhythm estimated, and
emit the associated useful substance from the emission unit when the time to start the emitting has come.

2. The emission device of claim 1, wherein the controller is configured to control the emission unit to emit the associated useful substance so that a cumulative total of time during which the associated useful substance is emitted from the emission unit is one hour or more in one day.

3. The emission device of claim 1, further comprising:
a concentration sensor configured to measure a concentration of the associated useful substance supplied to the target person,
the controller being configured to adjust an emission amount of the associated useful substance based on an output from the concentration sensor.

4. The emission device of claim 1, further comprising:
a biosensor configured to acquire biological information of the target person,
the controller being configured to control the emission unit to emit the associated useful substance based on the biological information acquired by the biosensor.

5. The emission device of claim 4, wherein
the biosensor is configured to detect a heart rate or a body temperature of the target person as the biological information, and
the controller is configured to
estimate the circadian rhythm of the target person from the heart rate or the body temperature detected by the biosensor, and
control the emission unit to emit the associated useful substance based on the circadian rhythm.

6. The emission device of claim 4, wherein
the biosensor is configured to detect a respiratory cycle of the target person as the biological information, and
the controller is configured to control the emission unit to emit the associated useful substance at a time when the target person inhales air.

7. The emission device of claim 1, wherein
the emission unit includes a vortex ring generation unit configured to emit an airflow in a vortex ring shape.

8. The emission device of claim 1, wherein
the emission unit includes an electrostatic sprayer.

9. The emission device of claim 1, further comprising:
an environment adjustment unit configured to adjust an environmental condition of the space;
the storage configured to store data on an environmental condition associated with the associated useful substance, the controller being configured to
acquire the environmental condition associated with the associated useful substance emitted from the emission unit based on the data stored in the storage, and
control the environment adjustment unit to meet the environmental condition.

10. The emission device of claim 2, further comprising:
a concentration sensor configured to measure a concentration of the associated useful substance supplied to the target person,
the controller being configured to adjust an emission amount of the associated useful substance based on an output from the concentration sensor.

11. The emission device of claim 2, further comprising:
a biosensor configured to acquire biological information of the target person,
the controller being configured to control the emission unit to emit the associated useful substance based on the biological information acquired by the biosensor.

12. The emission device of claim 3, further comprising:
a biosensor configured to acquire biological information of the target person,
the controller being configured to control the emission unit emit the associated useful substance based on the biological information acquired by the biosensor.

13. The emission device of claim 5, wherein
the biosensor is configured to detect a respiratory cycle of the target person as the biological information, and
the controller is configured to control the emission unit to emit the associated useful substance at a time when the target person inhales air.

14. The emission device of claim 2, wherein
the emission unit includes a vortex ring generation unit configured to emit an airflow in a vortex ring shape.

15. The emission device of claim 5, wherein
the emission unit includes a vortex ring generation unit configured to emit an airflow in a vortex ring shape.

16. The emission device of claim 4, wherein the emission unit includes a vortex ring generation unit configured to emit an airflow in a vortex ring shape.

17. The emission device of claim 5, wherein the emission unit includes a vortex ring generation unit configured to emit an airflow in a vortex ring shape.

18. The emission device of claim 6, wherein the emission unit includes a vortex ring generation unit configured to emit an airflow in a vortex ring shape.

19. The emission device of claim 2, wherein the emission unit includes an electrostatic sprayer.

20. The emission device of claim 5, wherein the emission unit includes an electrostatic sprayer.

\* \* \* \* \*